Figure 2:
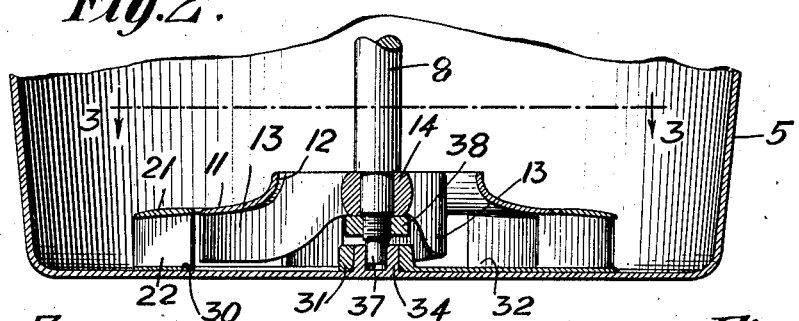

July 1, 1930.  J. PETERS  1,768,927
BEVERAGE MIXER
Filed March 28, 1929  2 Sheets-Sheet 1
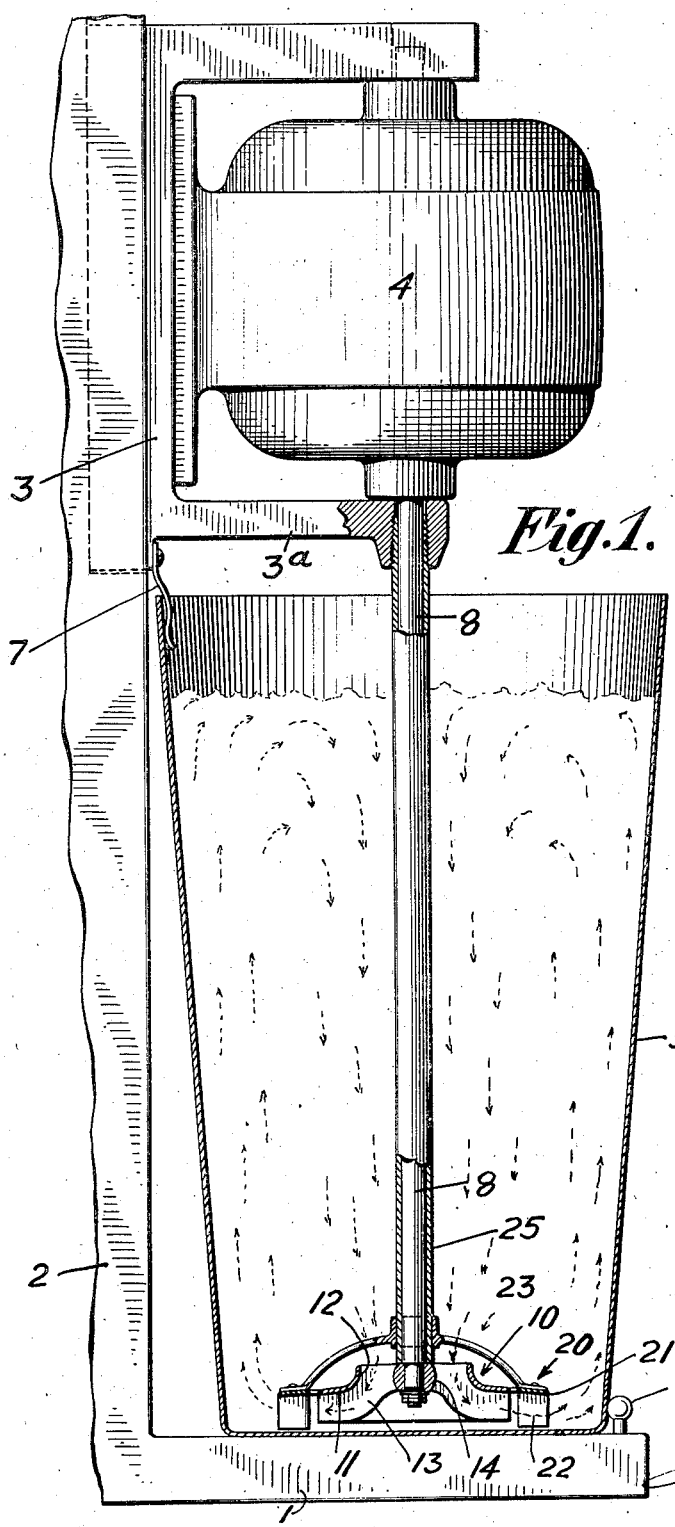
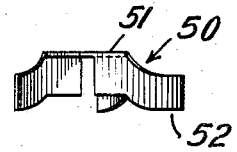
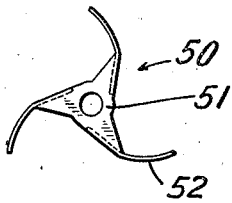
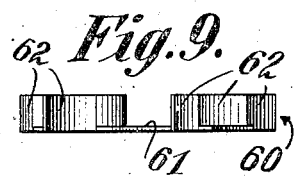
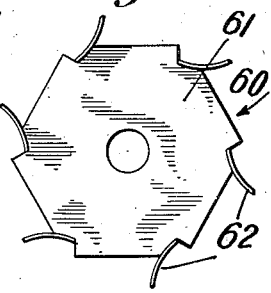
James Peters
INVENTOR
BY Frank J. Keul
ATTORNEY July 1, 1930.  J. PETERS  1,768,927
BEVERAGE MIXER
Filed March 28, 1929  2 Sheets-Sheet 2

James Peters
INVENTOR
BY
Frank Kent
ATTORNEY

Patented July 1, 1930

1,768,927

UNITED STATES PATENT OFFICE

JAMES PETERS, OF ROSLYN HEIGHTS, NEW YORK, ASSIGNOR TO THE TURBO-MIXER CORPORATION, OF NEW YORK, N. Y., A CORPORATION OF NEW YORK

BEVERAGE MIXER

Application filed March 28, 1929. Serial No. 350,492.

My invention relates to mixing apparatus of the class usually called "beverage mixers," designed for mixing liquids in small quantities, as in dispensing beverages at soda fountains.

The principal object is to provide a mixer of improved type, which rapidly and vigorously circulates the mixture and completes the blending of the ingredients in shorter time than is possible with devices previously used. A further object is to enable the mixer to be run at high speed, for quick and efficient mixing, without producing undesired rotation of the liquid in, and spilling from the receptacle.

The mixing mechanism proper includes a rotary, bladed impeller which draws the liquid in centrally and impels it tangentially outward, and a stationary bladed flow-controller, or deflector, which converts the tangential flow to radial flow, thus preventing undesired rotary movement of the general circulating mass, while producing rapid and thorough circulation and mixing.

In some cases the complete mixer is arranged as a unit, connected to a motor for vertical movement into and from the mixing cup; otherwise the deflector may be fixed in the cup bottom, and the impeller connected to the motor shaft, for movement to and from operative relation to the deflector.

The characteristics and advantages of the invention are further sufficiently explained in connection with the following detail description of the accompanying drawing, which shows representative embodiments. After considering these examples skilled persons will understand that many variations may be made without departing from the principles disclosed and I contemplate the employment of any structures that are properly within the scope of the appended claims.

In the drawing:

Fig. 1 is a combined side elevation and section of mixing apparatus embodying the invention in one form.

Figure 3:
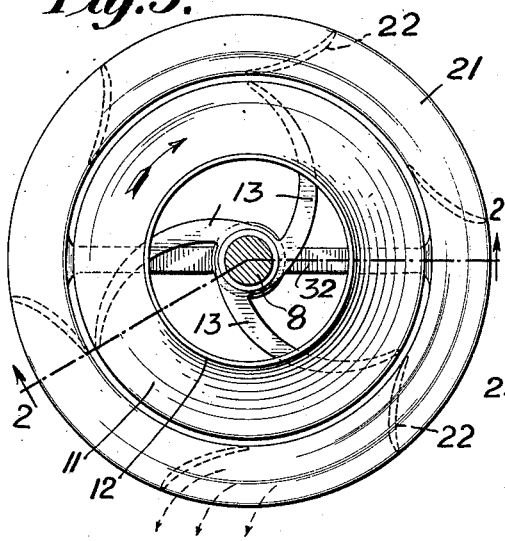
Figure 4:
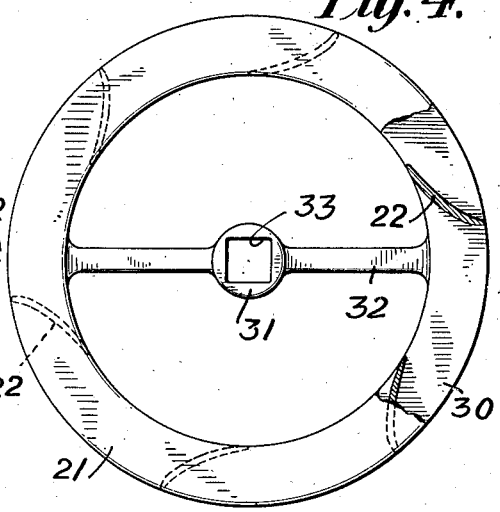
Figure 6:
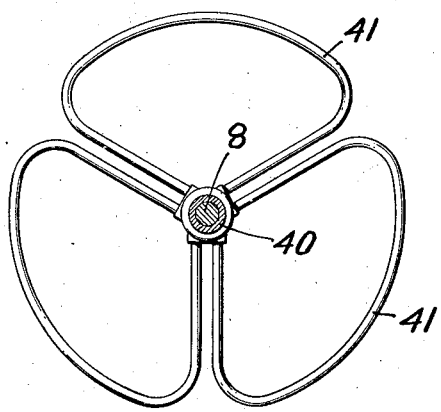
Figure 5:
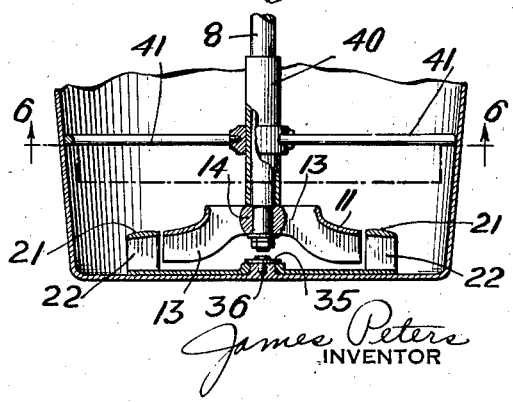

Fig. 2 is a vertical section of a modification.
Fig. 3 is a section at 3—3, Fig. 2.
Fig. 4 is a top plan of the deflector of Fig. 2.
Fig. 5 is a vertical section of a modification.
Fig. 6 is a section at 6—6, Fig. 4.
Fig. 7 is a side elevation of another form of impeller.
Fig. 8 is a top plan of the same.
Fig. 9 is a side elevation of a deflector suitable for cooperation with the impeller of Figs. 7 and 8.
Fig. 10 is a top plan of the deflector.

Fig. 1 shows the general features and arrangement of apparatus of this class, in one form, including a base 1, column 2 thereon, a slide or motor support 3 mounted for vertical movement on the column, a motor 4 carried by the slide, and a cup or can 5 removably located on the base, and retained in any convenient way, as by a lug or stud 6 and a clip 7.

The active mixing element in apparatus of this class is usually a simple fluted disc or button on the lower end of motor shaft 8, submerged in the liquid near the bottom of the cup. This is an inefficient mixer, which does not cause any definite or thorough circulation of the liquid, and therefore requires an undesirably long time for thorough mixing; and it also produces rapid rotation of the material so that spilling occurs if the cup is nearly fully, or the speed must be curtailed to avoid spilling.

To avoid these and other disadvantages of known mixers, and realize the objects above stated, I provide a mixer consisting of a rotor or impeller and a stationary deflector. In the form shown in Fig. 1, both main parts of the mixer are free from the cup, and connected to the motor or motor support, for movement as a unit into and from the cup.

The impeller 10 includes an annular plate 11 having an up-turned flange 12 forming a throat or entrance passage, and curved blades 13 (see also Fig. 3) connecting the plate to a hub 14, which is secured on the lower end of motor shaft 8. The stator, or deflector 20 has an annular top plate 21 provided with depending curved blades 22 (see also Fig. 3). Plate 21 is connected by spaced arms 23 to a sleeve 25, the upper end of which is non-rotatably connected to the motor casing, or as shown, to a motor-supporting arm 3ª, as by screwing the upper end of the sleeve into the bore in the arm, which also accommodates the motor shaft. The shaft 8 passes through sleeve 25, which thus serves as a long bearing and stiffener for the shaft, as well as holding the deflector stationary and locating it in proper relation to the impeller. The impeller and deflector are located, wherein active position, so that the lower edge of their blades are close to the bottom of the cup.

In operation, liquid is drawn down centrally adjacent the sleeve (as indicated by arrows, Fig. 1), enters the rotor throat, and is discharged horizontally and tangentially (Fig. 3) by the curved bades 13. This flow is intercepted by the deflector blades 22, which are arranged to divert the liquid to radial flow, toward the sides of the cup, and so upward toward the surface, then toward the center, and again downward to the impeller. In the arrangement shown, deflector plate 21 serves in conjunction with the cup bottom, to form an annular passage and discharge orifice, confining outflow to lower horizontal planes, at and below the level of the plate. The deflector prevents whirling movement of the liquid, which would produce a vortex at the surface, and the motor may be run at high speed, even when the cup is nearly full, without spilling; and the thorough circulation, and beating of the liquid by the impeller and deflector blades, produce complete mixing and blending of the materials in a short time.

Figs. 2 to 6 show modifications, in which the deflector is secured to the cup-bottom. It includes a lower plate, or ring 30 having a central hub formation 31. When the plate is an annulus, it may be connected to the hub by spaced arms 32. The hub has a polygonal aperture 33 fitting about a complementally formed boss 34 formed on or secured to the cup bottom, to prevent rotation of the deflector. The deflector may have an upper annular plate 21 as in Fig. 1, and the deflecting blades 22 are connected between the upper and lower plates; or, if the upper plate is omitted, the blades are connected to the lower plate or ring. The hub 31 need not be fixedly connected to boss 34, and in that case the deflector is easily and quickly detached from the cup for cleaning. Otherwise, as shown in Fig. 5, the deflector may be secured in position, as by a washer 35 overlapping the hub and secured to the boss by a screw 36. While definitely connected, the deflector may be removed by removing the screw.

In the arrangement of Fig. 2, the impeller is secured near the lower end of the shaft as in Fig. 1, but bearing sleeve 25 of Fig. 1 is omitted and the shaft has an extension 37 below the impeller and fastening nut 38, this extension forming a journal fitting in a bearing hole in boss 34. When the impeller is lowered to active position the journal enters the bearing hole, and the shaft and impeller are thus properly centered with relation to the deflector and oscillation is prevented.

In Figs. 5 and 6 no bearing mounting at the bottom of the cup is provided for the shaft end, but the lower part of the shaft and the impeller are centered by a spider consisting of a sleeve 40 loosely mounted on the lower portion of the shaft above the impeller and resting on the impeller hub and provided with struts or loops 41 of wire curved to engage and fit the cup wall and center the shaft.

Figs. 7 to 10 show a type of impeller and deflector which may be economically produced from sheet metal and may be used in place of the forms previously described. The impeller 50, Figs. 7 and 8, consists of a central portion 51 apertured to receive the shaft end and having curved blades 52 formed integrally therewith and bent down at right angles to the plane of the central portion. The deflector 60, Figs. 9 and 10, has a central or plate portion 61 to lie on the cup bottom and centrally apertured if desired to receive a boss or lug formed on or connected to the cup bottom. At its periphery the plate has integral, curved and tangential deflecting blades 62 bent up at right angles to the plane of the plate portion. The impeller, as shown in Figs. 7 and 8, does not have a definite throat or central intake for liquid, of the type shown in previous figures, but the blades are so spaced and the central portion 51 so formed as to permit ample inflow of liquid to inner portions of the blades.

I claim:

1. A beverage mixer or similar appliance comprising a base to receive a mixing cup, an upright, a motor mounted for vertical movement on the upright, a mixer including a rotary bladed impeller on the motor shaft and positioned near the bottom of the cup when the motor is lowered to active position, and means for centering the shaft and impeller consisting of a sleeve loosely mounted on the shaft and having arms extending to the cup wall.

2. A beverage mixer or similar appliance comprising a base to receive a mixing cup, an upright, a motor mounted for vertical movement on the upright, a mixer including a rotary bladed impeller on the motor shaft and positioned near the bottom of the cup when the motor is lowered to active position, and a stationary deflector located about the impeller, and a sleeve extending from the motor support and enclosing the motor shaft, the deflector being connected to a lower portion of the sleeve.

3. An impeller for purposes described, composed of sheet metal and including a central portion and integral, curved, approximately-tangential blades bent at right angles to the central portion.

4. A deflector for purposes described, consisting of sheet metal and having a central portion and integral, curved and approximately tangential blades bent at right angles to the central portion.

In testimony whereof I affix my signature.

JAMES PETERS.